US012734783B2

(12) United States Patent
Chou et al.

(10) Patent No.: US 12,734,783 B2
(45) Date of Patent: Sep. 15, 2026

(54) BREATHABLE AND WATERPROOF CLOTH AND MANUFACTURING METHOD THEREOF

(71) Applicant: TAIWAN TEXTILE RESEARCH INSTITUTE, New Taipei City (TW)

(72) Inventors: Hsin-Ying Chou, New Taipei City (TW); Haw-Jer Chang, New Taipei City (TW); Yuan-Pei Liao, New Taipei City (TW)

(73) Assignee: TAIWAN TEXTILE RESEARCH INSTITUTE, New Taipei City (TW)

( * ) Notice: Subject to any disclaimer, the term of this patent is extended or adjusted under 35 U.S.C. 154(b) by 205 days.

(21) Appl. No.: 18/407,525

(22) Filed: Jan. 9, 2024

(65) Prior Publication Data

US 2024/0227348 A1 Jul. 11, 2024

(30) Foreign Application Priority Data

Jan. 10, 2023 (TW) ................................ 112101079

(51) Int. Cl.

*B32B 5/26* (2006.01)
*B32B 5/02* (2006.01)

(Continued)

(52) U.S. Cl.

CPC .............. *B32B 5/268* (2021.05); *B32B 5/022* (2013.01); *B32B 7/12* (2013.01); *B32B 37/10* (2013.01);

(Continued)

(58) Field of Classification Search

CPC ..... B32B 5/268; B32B 5/022; B32B 2262/16; B32B 2262/0261; B32B 2305/28;

(Continued)

(56) References Cited

U.S. PATENT DOCUMENTS

2011/0064928 A1* 3/2011 Bonneh .................. B32B 5/022 428/212
2014/0326658 A1* 11/2014 Singh .................. B01D 69/127 210/489

(Continued)

FOREIGN PATENT DOCUMENTS

CN 104727016 A 6/2015
CN 105729918 B 1/2019

(Continued)

OTHER PUBLICATIONS

English translation of CN-112275045-A to Zhu et al. obtained from PE2E database (Year: 2021).*

*Primary Examiner* — Jeremy R Pierce

(74) *Attorney, Agent, or Firm* — McClure, Qualey & Rodack, LLP

(57) ABSTRACT

A breathable and waterproof cloth includes a base material, an electrospinning film, and a meltblown adhesive film. The electrospinning film is disposed on the base material and includes a plurality of nanofibers, and an average fiber fineness of the nanofibers ranges from 100 nm to 800 nm. The meltblown adhesive film is disposed between the base material and the electrospinning film. The meltblown adhesive film includes a plurality of meltblown fibers, and an average fiber fineness of the meltblown fibers ranges from 800 nm to 20 μm.

4 Claims, 2 Drawing Sheets

(51) Int. Cl.

| | |
|---|---|
| ***B32B 7/12*** | (2006.01) |
| ***B32B 37/10*** | (2006.01) |
| ***B32B 37/12*** | (2006.01) |
| ***B32B 37/24*** | (2006.01) |
| ***D01F 1/10*** | (2006.01) |
| ***D01F 6/60*** | (2006.01) |
| ***D04H 1/4334*** | (2012.01) |
| ***D04H 1/4382*** | (2012.01) |
| ***D04H 1/44*** | (2006.01) |
| ***D04H 1/56*** | (2006.01) |
| ***D04H 1/728*** | (2012.01) |
| ***D04H 3/16*** | (2006.01) |

(52) U.S. Cl.

CPC .......... *B32B 37/1284* (2013.01); *B32B 37/24* (2013.01); *D01F 1/10* (2013.01); *D01F 6/60* (2013.01); *D04H 1/4334* (2013.01); *D04H 1/43838* (2020.05); *D04H 1/44* (2013.01); *D04H 1/56* (2013.01); *D04H 1/728* (2013.01); *D04H 3/16* (2013.01); *B32B 2262/0261* (2013.01); *B32B 2262/16* (2021.05); *B32B 2305/28* (2013.01); *B32B 2307/308* (2013.01); *B32B 2307/54* (2013.01); *B32B 2307/718* (2013.01); *B32B 2307/724* (2013.01); *B32B 2307/7265* (2013.01); *B32B 2307/748* (2013.01); *B32B 2377/00* (2013.01); *D10B 2401/021* (2013.01); *D10B 2401/063* (2013.01); *D10B 2401/10* (2013.01)

(58) Field of Classification Search

CPC .......... B32B 2307/308; B32B 2307/54; B32B 2307/718; B32B 2307/724; B32B 2307/7265; B32B 2307/748; B32B 2377/00; D04H 1/43838; D04H 1/4334; D04H 1/44; D04H 1/56; D04H 1/728; D04H 1/03–16; D01F 1/10; D01F 6/60; D10B 2401/021; D10B 2401/063; D10B 2401/10

See application file for complete search history.

(56) References Cited

U.S. PATENT DOCUMENTS

| | | | | |
|---|---|---|---|---|
| 2019/0030855 A1* | 1/2019 | Anantharamaiah | ....... | B32B 5/26 |
| 2020/0324510 A1* | 10/2020 | Yung | ....................... | B32B 5/022 |
| 2020/0368654 A1* | 11/2020 | Higginson | .............. | B32B 5/022 |
| 2022/0023784 A1* | 1/2022 | Hassounah | ........ | B01D 39/2017 |
| 2023/0040653 A1* | 2/2023 | Chin | ....................... | B32B 5/022 |

FOREIGN PATENT DOCUMENTS

| | | | | |
|---|---|---|---|---|
| CN | 112275045 A * | 1/2021 | ............. | B01D 46/64 |
| TW | 112101078 | 1/2023 | | |

* cited by examiner

BREATHABLE AND WATERPROOF CLOTH AND MANUFACTURING METHOD THEREOF

CROSS-REFERENCE TO RELATED APPLICATION

This application claims priority to Taiwan Application Serial Number 112101079, filed Jan. 10, 2023, which is herein incorporated by reference.

BACKGROUND

Field of Disclosure

The present disclosure relates to a cloth and a manufacturing method thereof, and particularly relates to a breathable and waterproof cloth and a manufacturing method thereof.

Description of Related Art

In recent years, in addition to the appearance design requirements in the development of textile industry, technology is also introduced to strengthen the functionality of clothing. As a functional fabric, breathable and waterproof fabric can release moisture on the surface of human body when worn, and prevent moisture from the external environment from entering the fabric, thereby being widely used in outdoor leisure clothing. However, conventional breathable and waterproof fabrics tend to lose part of their air permeability during processing, and in order to maintain the breathability of the breathable and waterproof fabric, it is often achieved by reducing the closeness of each layer in the fabric, resulting in low structural stability of the breathable and waterproof fabric. Therefore, how to provide a breathable and waterproof fabric with high air permeability, high waterproofness, and high interlayer strength is an issue for those skilled in the art.

SUMMARY

The present disclosure provides a breathable and waterproof cloth and a manufacturing method thereof. The breathable and waterproof cloth prepared by the manufacturing method of the present disclosure can be provided with high air permeability, high waterproofness, and high interlayer strength.

According to some embodiments of the present disclosure, a breathable and waterproof cloth includes a base material, an electrospinning film, and a meltblown adhesive film. The electrospinning film is disposed on the base material and includes a plurality of nanofibers, and an average fiber fineness of the nanofibers ranges from 100 nm to 800 nm. The meltblown adhesive film is disposed between the base material and the electrospinning film. The meltblown adhesive film includes a plurality of meltblown fibers, and an average fiber fineness of the meltblown fibers ranges from 800 nm to 20 μm.

In some embodiments of the present disclosure, a material of the nanofibers and a material of the meltblown fibers are the same, and the breathable and waterproof cloth has an air permeability value larger than or equal to 0.7 cubic feet per centimeter (CFM), a water pressure resistance value larger than or equal to 6300 $mmH_2O$, and a tensile strength value larger than or equal to 50 kilogram-force (kgf).

In some embodiments of the present disclosure, a melting point of the meltblown fibers ranges from 80° C. to 150° C.

In some embodiments of the present disclosure, the meltblown adhesive film has a plurality of pores, and an average diameter of the pores ranges from 100 nm to 1000 nm.

In some embodiments of the present disclosure, the breathable and waterproof cloth has a softness value less than or equal to 5 N/cm and a resistance to evaporative transfer (RET) value less than 10.

According to some other embodiments of the present disclosure, a manufacturing method of a breathable and waterproof cloth includes: performing a melt-blowing process to form a meltblown adhesive film including a plurality of meltblown fibers, in which a melting point of the meltblown fibers ranges from 80° C. to 150° C.; performing an electrospinning process to form an electrospinning film on the meltblown adhesive film, in which the electrospinning film includes a plurality of nanofibers; and performing a heat-pressing process to form the meltblown adhesive film configured with the electrospinning film to a surface of a base material.

In some embodiments of the present disclosure, a material of the meltblown fibers and a material of the nanofibers include nylon.

In some embodiments of the present disclosure, the electrospinning process is a needle-free electrospinning process.

In some embodiments of the present disclosure, an electrospinning solution used for the electrospinning process includes a first additive and a second additive. The first additive includes a nylon copolymer and an alcohol. The second additive includes a polysilazane resin and a perfluoropolyether-modified polysilazane resin.

In some embodiments of the present disclosure, a solubility of the second additive to the alcohol ranges from 1 volume percentage concentration (vol %) to 20 volume percentage concentration.

According to the aforementioned embodiments of the present disclosure, since the electrospinning film is directly formed on the surface of the meltblown adhesive film through the electrospinning process, and the meltblown adhesive film configured with the electrospinning film is directly heat-pressed on the surface of the base material, tedious manufacturing processes can be replaced. On the other hand, since the meltblown adhesive film formed by the melt-blowing process includes a plurality of meltblown fibers intertwined with each other, the meltblown adhesive film can have a large specific surface area, which can provide uniform, stable, and strong adhesion, such that the breathable and waterproof cloth has high interlayer strength. In addition, since the nanofibers in the electrospinning film have a suitable average fiber fineness, it can provide the breathable and waterproof cloth with high air permeability and high waterproofness, and since the meltblown fibers in the meltblown adhesive film have a suitable average fiber fineness, the configuration of the meltblown adhesive film will not adversely affect the air permeability of the breathable and waterproof cloth.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
FIG. 1 is a schematic breakdown view illustrating a breathable and waterproof cloth according to some embodiments of the present disclosure.
Figure 1:
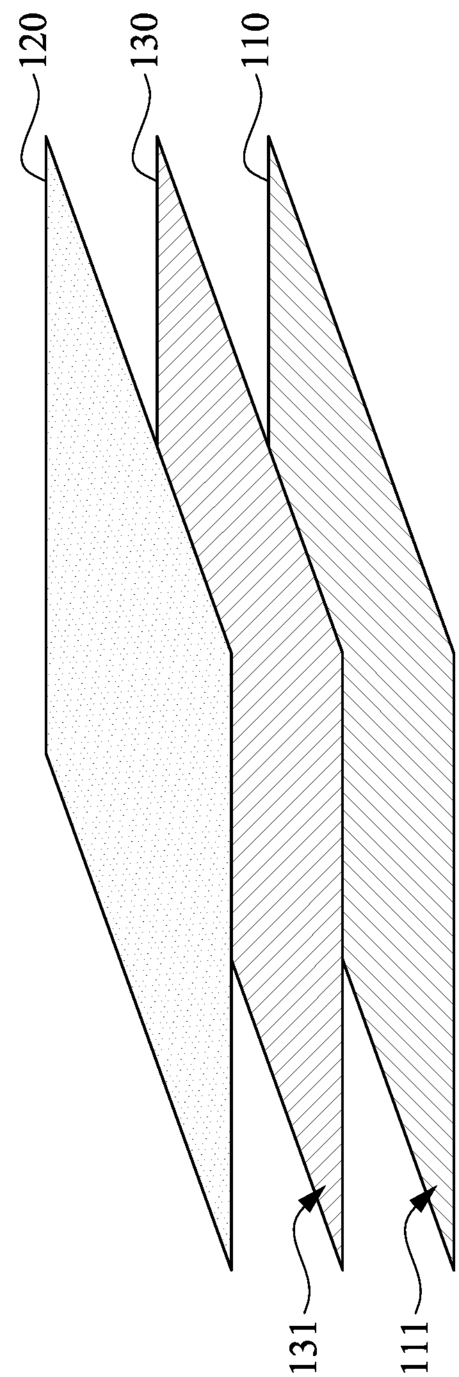

Reference will now be made in detail to the present embodiments of the disclosure, examples of which are illustrated in the accompanying drawings. However, it should be understood that these details should not be intend to limit the present disclosure. In addition, for the convenience of readers, the size of each element in the drawings is not illustrated according to actual scale.

The present disclosure provides a breathable and waterproof cloth and a manufacturing method thereof. The manufacturing method of the breathable and waterproof cloth of the present disclosure can replace the conventional manufacturing method that is tedious, for example, the adhesive dispense method. In addition, the breathable and waterproof cloth prepared by the manufacturing method of the present disclosure can be provided with high air permeability, high waterproofness, and high interlayer strength.

Reference is made to FIG. 1, which is a schematic breakdown view illustrating a breathable and waterproof cloth 100 according to some embodiments of the present disclosure. The breathable and waterproof cloth 100 includes a base material 110, an electrospinning film 120, and a meltblown adhesive film 130. The electrospinning film 120 is disposed on a first surface 111 of the base material 110 and includes a plurality of nanofibers, and the meltblown adhesive film 130 is disposed between the base material 110 and the electrospinning film 120 and includes a plurality of meltblown fibers. By adjusting the fiber fineness of the nanofibers in the electrospinning film 120, the electrospinning film 120 can be provided with pores with a suitable size, thus being provided with high air permeability and high waterproofness. In the present disclosure, an average fiber fineness of the nanofibers ranges from 100 nm to 800 nm (e.g., 200 nm, 300 nm, 400 nm, 500 nm, 600 nm, or 700 nm). In detail, if the average fiber fineness of the nanofibers is greater than 800 nm, the pore size of the electrospinning film 120 may be too large, causing the electrospinning film 120 to fail to provide high waterproofness, and if the nanofibers are compressed more tightly in order to reduce the pore size, although the waterproofness can be improved, the air permeability of the electrospinning film 120 may be reduced; and if it is desired to form nanofibers with an average fiber fineness less than 100 nm, it is necessary to further adjust the electrospinning parameters and the ingredient of the electrospinning solution, which is not conducive to cost considerations. In some embodiments, the electrospinning film 120 can have a plurality of pores, and an average diameter of the pores can ranges from 100 nm to 1000 nm (e.g., 200 nm, 300 nm, 400 nm, 500 nm, 600 nm, 700 nm, 800 nm, or 900 nm). By adjusting the average diameter of the pores in the electrospinning film 120 to be within the above range, the electrospinning film 120 can preferably be provided with high air permeability and high waterproofness, and as mentioned above, the control of the pore size can be achieved by adjusting the average fiber fineness of the nanofibers.

On the other hand, by adjusting the fiber fineness of the meltblown fibers in the meltblown adhesive film 130, the electrospinning film 120 can be closely arranged on the base material 110 without affecting the air permeability of the electrospinning film 120. In the present disclosure, the average fiber fineness of the meltblown fibers ranges from 800 nm to 20 μm (e.g., 900 nm, 1 μm, 5 μm, 10 μm, 15 μm, or 20 μm). In detail, if the average fiber fineness of the meltblown fibers is larger than 20 μm, the specific surface area of the meltblown adhesive film 130 may be too low to provide uniform, stable, and high-strength adhesion, and the excessively thick meltblown fibers may excessively cover the pores of the electrospinning film 120, thereby reducing the air permeability of the electrospinning film 120; and if it is desired to form meltblown fibers with an average fiber fineness less than 800 nm, it is relatively difficult to control the melt-blowing process, which is not conducive to cost considerations.

Figure 2:
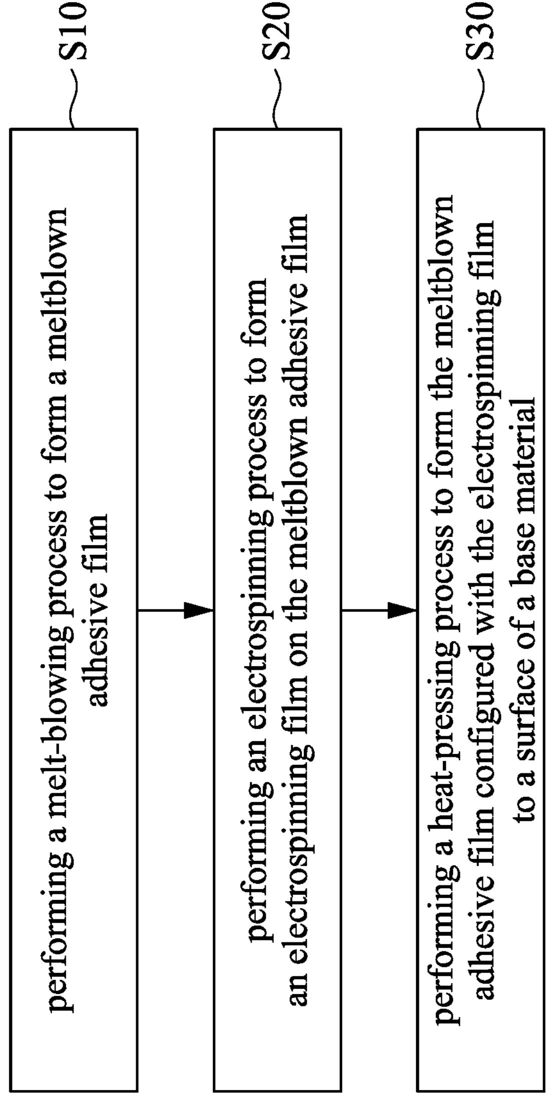
FIG. 2 is a flow chart illustrating a manufacturing method of a breathable and waterproof cloth according to some embodiments of the present disclosure.

For the sake of clarity, the means for achieving the effect of the present disclosure will be presented in more detail in the following by illustrating the manufacturing method of the breathable and waterproof cloth 100 of the present disclosure. Reference is made to FIG. 2, which is a flow chart illustrating a manufacturing method of a breathable and waterproof cloth 100 according to some embodiments of the present disclosure. The manufacturing method of the breathable and waterproof cloth 100 includes step S10 to step S30 which can be performed in sequence. In step S10, a melt-blowing process is performed to form a meltblown adhesive film 130 including a plurality of meltblown fibers. In step S20, an electrospinning process is performed to form an electrospinning film 120 on the meltblown adhesive film 130. In step S30, a heat-pressing process is performed to form the meltblown adhesive film 130 configured with the electrospinning film 120 to a first surface 111 of a base material 110. In the following description, the above steps will be further described.

Firstly, in step S10, a melt-blowing process is performed to form a meltblown adhesive film 130 including a plurality of meltblown fibers intertwined with each other. The function of the meltblown adhesive film 130 is to combine the electrospinning film 120 with the base material 110 in the subsequent heat-pressing process. That is, the colloid used to bond the electrospinning film 120 and the base material 110 in the present disclosure is not a colloid with a solid structure, but a meltblown fiber film (meltblown adhesive film 130) with a plurality of pores to provide a larger specific surface area, thereby providing uniform, stable, and high-strength adhesion, such that the breathable and waterproof cloth 100 has high interlayer strength. In addition, since the meltblown adhesive film 130 formed by the melt-blowing process can be provided with a larger pore size, the air permeability of the electrospinning film 120 can be well maintained. In some embodiments, a melting point of the meltblown fibers may ranges from 80° C. to 150° C. As such, it is not necessary to use an excessively high heat-pressing temperature for the subsequent heat-pressing process, thereby avoiding damage to the structure of the breathable and waterproof cloth 100 due to high temperature, and also ensuring that the meltblown adhesive film 130 can melt to a certain extent at a low heat-pressing temperature, so as to provide uniform, stable, and high-strength adhesion.

Next, in step S20, an electrospinning process is performed to directly form the electrospinning film 120 on a second surface 131 of the meltblown adhesive film 130. More specifically, the meltblown adhesive film 130 of the present disclosure is used as a receiving substrate to receive a plurality of nanofibers ejected from the electrospinning equipment, such that the electrospinning film 120 is directly formed on the second surface 131 of the meltblown adhesive film 130. As such, the steps of secondary processing can be omitted (for example, the step of sticking the adhesive layer on the surface of the electrospinning film by the conventional adhesive dispense method), and since the electrospinning film 120 directly covers the entire second surface 131 of the meltblown adhesive film 130, there is a larger contact area between the electrospinning film 120 and the meltblown adhesive film 130, such that the electrospinning film 120 is closely combined with the meltblown adhesive film 130. In some embodiments, the material of the nanofibers formed by the electrospinning process and the material of the meltblown fibers formed by the melt-blowing process can be the same. That is, the material of the nanofibers in the electrospinning film 120 and the material of the meltblown fibers in the meltblown adhesive film 130 can be the same. Through the material homogeneity design of the electrospinning film 120 and the meltblown adhesive film 130, the electrospinning film 120 and the meltblown adhesive film 130 can be partially melted and combined with each other in the same heat-pressing temperature range during the subsequent heat-pressing process, and the electrospinning film 120 and the meltblown adhesive film 130 can have a relatively stable combination, thereby providing the breathable and waterproof cloth 100 with high interlayer strength. In some embodiments, the material of the nanofibers in the electrospinning film 120 and the material of the meltblown fibers in the meltblown adhesive film 130 may include nylon, so as to provide better air permeability.

In some embodiments, a suitable electrospinning solution can be used to carry out the electrospinning process, such that the formed electrospinning film 120 can have high air permeability and high hydrophobicity, and the nanofibers in the electrospinning film 120 can have high fiber strength and high fiber elongation, such that the subsequently formed breathable and waterproof cloth 100 has high air permeability, high waterproofness, and flexibility. In detail, the electrospinning solution may include a first additive and a second additive, in which the first additive includes a nylon copolymer and an alcohol, and the second additive includes a polysilazane resin and a perfluoropolyether-modified polysilazane resin. The first additive including the above components can provide the electrospinning solution with good spinnability, and the second additive including the above components can provide the electrospinning film 120 with high hydrophobicity, and provide the nanofibers in the electrospinning film 120 with high fiber strength and high fiber elongation.

For the first additive, in some embodiments, the nylon copolymer in the first additive can be used to form the base material (main material) of the nanofibers in the electrospinning film 120. When a nylon copolymer with high wear resistance is used as the base material of nanofibers, the electrospinning film 120 can be provided with high wear resistance, such that the breathable and waterproof cloth 100 is suitable for the field of outdoor functional clothing. In some embodiments, the alcohol in the first additive can be used as a solvent, such that the electrospinning solution is suitable for an electrospinning process such as needle-free electrospinning, thereby forming the electrospinning film 120 rapidly on the first surface 111 of the base material 110. In some embodiments, the alcohol in the first additive can be ethanol, such that the electrospinning solution has the advantages of easy volatility, low toxicity, and low corrosion, so as to be environmentally friendly. In some embodiments, a content of the nylon copolymer may be 5 parts by weight to 15 parts by weight, and a content of alcohol may be 85 parts by weight to 95 parts by weight. The above ratio of the components is conducive for the electrospinning solution to forming of nanofibers with suitable fiber fineness, such that the electrospinning film 120 has pores with suitable size, making the breathable and waterproof cloth 100 have high air permeability and high waterproofness. In some embodiments, the solubility of the nylon copolymer to the alcohol can range from 5 wt % to 15 wt %, so as to form an electrospinning solution with high uniformity. In some embodiments, the nylon copolymer can be, for example, a copolymer of copolyamide and an alkoxy-modified nylon 46/66 copolymer, such that the nylon copolymer can be soluble in the alcohol, thereby improving the spinnability of the electrospinning solution.

For the second additive, since the second additive includes a polysilazane resin and a perfluoropolyether-modified polysilazane resin, it can make the electrospinning film 120 have high hydrophobicity, thereby providing the breathable and waterproof cloth 100 with high waterproofness. In addition, the polysilazane resin and the perfluoropolyether-modified polysilazane resin can provide additional advantages for the electrospinning film 120. Specifically, the polysilazane resin and the perfluoropolyether-modified polysilazane resin can improve the fiber strength and the fiber elongation of the nanofibers, making the electrospinning film 120 flexible, thereby improving the flexibility and the processability of the breathable and waterproof cloth 100. In addition, the polysilazane resin and the perfluoropolyether-modified polysilazane resin can also reduce the agglomeration of the electrospinning solution during the electrospinning process, and solve the problem that the electrospinning solution is difficult to gel, thereby improving the spinnability of the electrospinning solution and the production efficiency of the breathable and waterproof cloth 100. In some embodiments, a content of the perfluoropolyether segment may range from 0.5 parts by weight to 1.5 parts by weight based on 100 parts by weight of the electrospinning solution. In detail, if the content of the perfluoropolyether segment is greater than 1.5 parts by weight based on 100 parts by weight of the electrospinning solution, the adhesion of the electrospinning film 120 to the base material 110 may be reduced, and the pore size of the electrospinning film 120 may also be reduced, thereby affecting the washing fastness or the air permeability of the breathable and waterproof cloth 100; and if the content of the perfluoropolyether segment is less than 0.5 parts by weight based on 100 parts by weight of the electrospinning solution, the waterproofness of the electrospinning film 120 and the fiber strength and the fiber elongation of the nanofibers in the electrospinning film 120 may be reduced.

For the electrospinning solution, in some embodiments, based on 100 parts by volume of the electrospinning solution, a content of the first additive may range from 80 parts by volume to 90 parts by volume, and a content of the first additive may range from 10 parts by volume to 20 parts by volume, thereby providing the electrospinning film 120 with high air permeability, high waterproofness, and flexibility. In some embodiments, the second additive can have good solubility to the alcohol in the first additive, such that the second additive can be mixed with the first additive to form a homogeneous electrospinning solution. For example, the solubility of the second additive to the alcohol in the first additive can range from 0.5 vol % to 20 vol %, so as to provide good spinnability for the electrospinning solution.

After step S20, the electrospinning film 120 disposed on the second surface 131 of the meltblown adhesive film 130 can be obtained. For the electrospinning film 120, it has high waterproofness, high air permeability, high strength, and flexibility. In some embodiments, the water pressure resistance value of the electrospinning film 120 may range from 4000 $mmH_2O$ to 22000 $mmH_2O$, and the water droplet contact angle of the electrospinning film 120 may range from 130 degrees to 150 degrees. In some embodiments, the air permeability value of the electrospinning film 120 may range from 0.6 CFM to 10 CFM. In some embodiments, the fiber strength value of the nanofibers in the electrospinning film 120 may range from 0.1 kgf to 1 kgf, and the fiber elongation value of the nanofibers in the electrospinning film 120 may range from 20% to 130%.

Subsequently, in step S30, a heat-pressing process is performed to press the meltblown adhesive film 130 configured with the electrospinning film 120 onto the first surface 111 of the substrate 110. Specifically, during the heat-pressing process, the meltblown adhesive film 130 may be partially melted between the electrospinning film 120 and the base material 110 to bond the electrospinning film 120 and the base material 110 to each other. It is worth noting that since the meltblown adhesive film 130 may melt at the interface between the meltblown adhesive film 130 and the electrospinning film 120 and at the interface between the meltblown adhesive film 130 and base material 110, the meltblown adhesive film 130 may penetrate between the nanofibers of the electrospinning film 120 from the interface between the meltblown adhesive film 130 and the electrospinning film 120, and the meltblown adhesive film 130 may penetrate between the fibers of the base material 110 from the interface between the meltblown adhesive film 130 and the base material 110, thereby forming a tight and fast bond. In some embodiments, the base material 110 may be a woven fabric or a non-woven fabric, and the material of the base material 110 may be nylon, polypropylene, polyvinylpyrrolidone, polyester, or combinations thereof. When the materials of the electrospinning film 120 and the meltblown adhesive film 130 are nylon, the material of the base material 110 is preferably nylon, such that the breathable and waterproof cloth 100 has material homogeneity, which is conducive for the heat-pressing process to be performed in a specific temperature range. In addition, when the materials of the base material 110, the electrospinning film 120 and the meltblown adhesive film 130 are nylon, since the base material 110, the electrospinning film 120 and the meltblown adhesive film 130 may all melt at the interface between the base material 110 and the meltblown adhesive film 130 and at the interface between the electrospinning film 120 and the meltblown adhesive film 130, the structural strength (tensile strength) and interlayer strength (peeling strength) of the breathable and waterproof cloth 100 can be further improved.

After step S30, the breathable and waterproof cloth 100 can be obtained. In some embodiments, the breathable and waterproof cloth 100 may have a low basis weight to improve the softness and wearing comfort of the breathable and waterproof cloth 100. For example, the basis weight of the breathable and waterproof cloth 100 can be 3 grams per square (gsm) to 20 gsm, and preferably 5 gsm to 20 gsm.

The efficacy of the present disclosure will be described in more detail below with reference to the breathable and waterproof cloth of the present disclosure. It should be understood that the materials used, their amounts and proportions, processing details, and processing procedures may be appropriately changed without departing from the scope of the present disclosure. Therefore, the present disclosure should not be limited by the embodiments described below.

Experiment 1: Tensile Strength Test on Breathable and Waterproof Cloth

In this experiment, standard method ASTM D5034 was used to carry out the tensile strength test on the breathable and waterproof cloth of Embodiments 1-2 and a commercially available breathable and waterproof cloth (i.e., Comparative Example 1). Among them, the material of each layer in the breathable and waterproof cloths of Embodiments 1-2 was nylon, and the breathable and waterproof cloth of Comparative Example 1 was purchased from Korea lemon. The results are shown in Table 1.

TABLE 1

| | Comparative Example 1 (basis weight: 8 gsm) | Embodiment 1 (basis weight: 8 gsm) | Embodiment 2 (basis weight: 15 gsm) |
|---|---|---|---|
| Tensile Strength (kgf) | 25.630 | ≥50 | ≥50 |

Table 1 shows that the breathable and waterproof cloth of Embodiment 1-2 can have a tensile strength value greater than or equal to 50 kgf, which is better than the tensile strength value of commercially available breathable and waterproof cloth. It can be seen that the breathable and waterproof cloth prepared by the manufacturing method of the present disclosure has high structural strength.

Experiment 2: Air Permeability Test on Breathable and Waterproof Cloth

In this experiment, standard method ASTM D737 was used to carry out the air permeability test on the breathable and waterproof cloth of Embodiments 2-5, in which Embodiment 2 was as mentioned above, the breathable and waterproof cloths of Embodiment 3-5 respectively had the base weight of 5 gsm, 10 gsm, and 20 gsm, and the material of each layer in the breathable and waterproof cloths of Embodiment 3-5 was nylon. The results show that the breathable and waterproof cloths of Embodiment 3-5 respectively have the air permeability value of 1.2 CFM, 2.02 CFM, 1.78 CFM, and 0.7 CFM, which are far better than the air permeability value of many breathable and waterproof cloths on the market (0.5 CFM).

Experiment 3: Waterproofness Test on Breathable and Waterproof Cloth

In this experiment, standard method JISL1092 was used to carry out the water pressure resistance test on the breathable and waterproof cloth of Embodiment 2 for five times, and standard method CNS 15102 L3256 was used to carry out the resistance to evaporative transfer (RET) test on the breathable and waterproof cloth of Embodiment 2. The results are shown in Table 2.

TABLE 2

| Results of Water Pressure Resistance Test | | | | | |
|---|---|---|---|---|---|
| No. | 1 | 2 | 3 | 4 | 5 |
| Water Pressure Resistance Value (mm $H_2O$) | 11800 | 10090 | 11300 | 10100 | 10500 |
| Average Value (mm $H_2O$) | | | 10758 | | |
| Result of Resistance to Evaporative Transfer (RET) Test | | | | | |
| Resistance to Evaporative Transfer Value: 4 ($m^2$ × Pa)/W | | | | | |

Table 2 shows that the breathable and waterproof cloth of Embodiment 2 can have a water pressure resistance value greater than 10000 $mmH_2O$ and a resistance to evaporative transfer value of 4 ($m^2$×Pa)/W. It can be seen that the breathable and waterproof cloth prepared by the manufacturing method of the present disclosure has high waterproofness. On the other hand, the standard method JISL1092 was also used to carry out the water pressure resistance test on the breathable and waterproof cloths of Embodiments 3, 4, and 5 for five times, and the results show that the average values of the water pressure resistance of the breathable and waterproof cloths of Embodiments 3, 4, and 5 are respectively 6300 $mmH_2O$, 8730 $mmH_2O$, and 11750 $mmH_2O$. In other words, the breathable and waterproof cloth of the present disclosure can have a water pressure resistance value greater than or equal to 6300 $mmH_2O$, and it can be known from other embodiments which are not listed hereinafter that the water pressure resistance value of the breathable and waterproof cloth of the present disclosure can be between any two of the water pressure resistance values in table 2.

Experiment 4: Softness Test on Breathable and Waterproof Cloth

In this experiment, standard method CNS12915 was used to carry out the softness test on the breathable and waterproof cloth of Embodiment 3. The results show that the breathable and waterproof cloth can have a softness value less than or equal to 5 N/cm, and preferably can have a softness value less than or equal to 4 N/cm. Thus, the breathable and waterproof cloth has good flexibility.

Experiment 5: Washing Fastness Test on Breathable and Waterproof Cloth

In this experiment, standard method AATCC135 was used to carry out the washing fastness test to the breathable and waterproof cloths of Embodiments 2-5, in order to obtain the water pressure resistance value, the air permeability value, and the peeling strength value of the breathable and waterproof cloth after 50 times of washing. The results are shown in Table 3.

TABLE 3

| | Embodiment 2 | | Embodiment 3 | | Embodiment 4 | | Embodiment 5 | |
|---|---|---|---|---|---|---|---|---|
| | Before Washing | After Washing | Before Washing | After Washing | Before Washing | After Washing | Washing Before | After Washing |
| Water Pressure Resistance Value ($mmH_2O$) | 10758 | 9760 | 6300 | 5000 | 8730 | 7800 | 11750 | 10760 |
| Air Permeability Value (CFM) | 1.2 | 1.35 | 2.02 | 1.98 | 1.78 | 1.75 | 0.7 | 0.72 |
| Peeling Strength Value (gf/cm) | 292 | 287 | 200 | 185 | 275 | 260 | 302 | 283 |

Table 3 shows that the breathable and waterproof cloth of the present disclosure can still maintain good waterproofness (having a water pressure resistance value greater than or equal to 5000 $mmH_2O$), good air permeability (having an air permeability value greater than or equal to 0.72 CFM), and good interlayer strength (having a peeling strength value greater than or equal to 185 gf/cm), indicating that the breathable and waterproof cloth prepared by the manufacturing method of the present disclosure has good washing fastness resistance and thus has wide applicability.

According to the aforementioned embodiments of the present disclosure, since the electrospinning film is directly formed on the surface of the meltblown adhesive film through the electrospinning process, and the meltblown adhesive film configured with the electrospinning film is directly heat-pressed on the surface of the base material, the conventional tedious manufacturing processes can be replaced. On the other hand, since the meltblown adhesive film formed by the melt-blowing process includes a plurality of meltblown fibers intertwined with each other, the meltblown adhesive film can have a large specific surface area, which can provide uniform, stable, and strong adhesion, such that the breathable and waterproof cloth has high interlayer strength. In addition, since the nanofibers in the electrospinning film have a suitable average fiber fineness, it can provide the breathable and waterproof cloth with high air permeability and high waterproofness, and since the meltblown fibers in the meltblown adhesive film have a suitable average fiber fineness, the configuration of the meltblown adhesive film will not adversely affect the air permeability of the breathable and waterproof cloth. Overall, the breathable and waterproof cloth can have high air permeability, high waterproofness, high structural strength, high interlayer strength, flexibility, and high washing fastness.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A breathable and waterproof cloth, comprising:

a base material;

an electrospinning film disposed on the base material, wherein the electrospinning film comprises a plurality of nanofibers, and an average fiber fineness of the nanofibers ranges from 100 nm to 800 nm; and a meltblown adhesive film disposed between the base material and the electrospinning film, wherein the meltblown adhesive film comprises a plurality of meltblown fibers, an average fiber fineness of the meltblown fibers ranges from 800 nm to 20 μm, a melting point of the meltblown fibers ranges from 80° C. to 150° C., and each of the materials of the base material, the electrospinning film, and the meltblown adhesive film is nylon.

2. The breathable and waterproof cloth of claim 1, wherein a material of the nanofibers and a material of the meltblown fibers are the same, and the breathable and waterproof cloth has an air permeability value larger than or equal to 0.7 cubic feet per centimeter, a water pressure resistance value larger than or equal to 6300 $mmH_2O$, and a tensile strength value larger than or equal to 50 kilogram-force.

3. The breathable and waterproof cloth of claim 1, wherein the meltblown adhesive film has a plurality of pores, and an average diameter of the pores ranges from 100 nm to 1000 nm.

4. The breathable and waterproof cloth of claim 1, wherein the breathable and waterproof cloth has a softness value less than or equal to 5 N/cm and a resistance to evaporative transfer value less than 10.

* * * * *